Jan. 27, 1959  B. R. BELLMANN ET AL  2,870,641
ADJUSTABLE PULLEYS
Filed Sept. 11, 1956
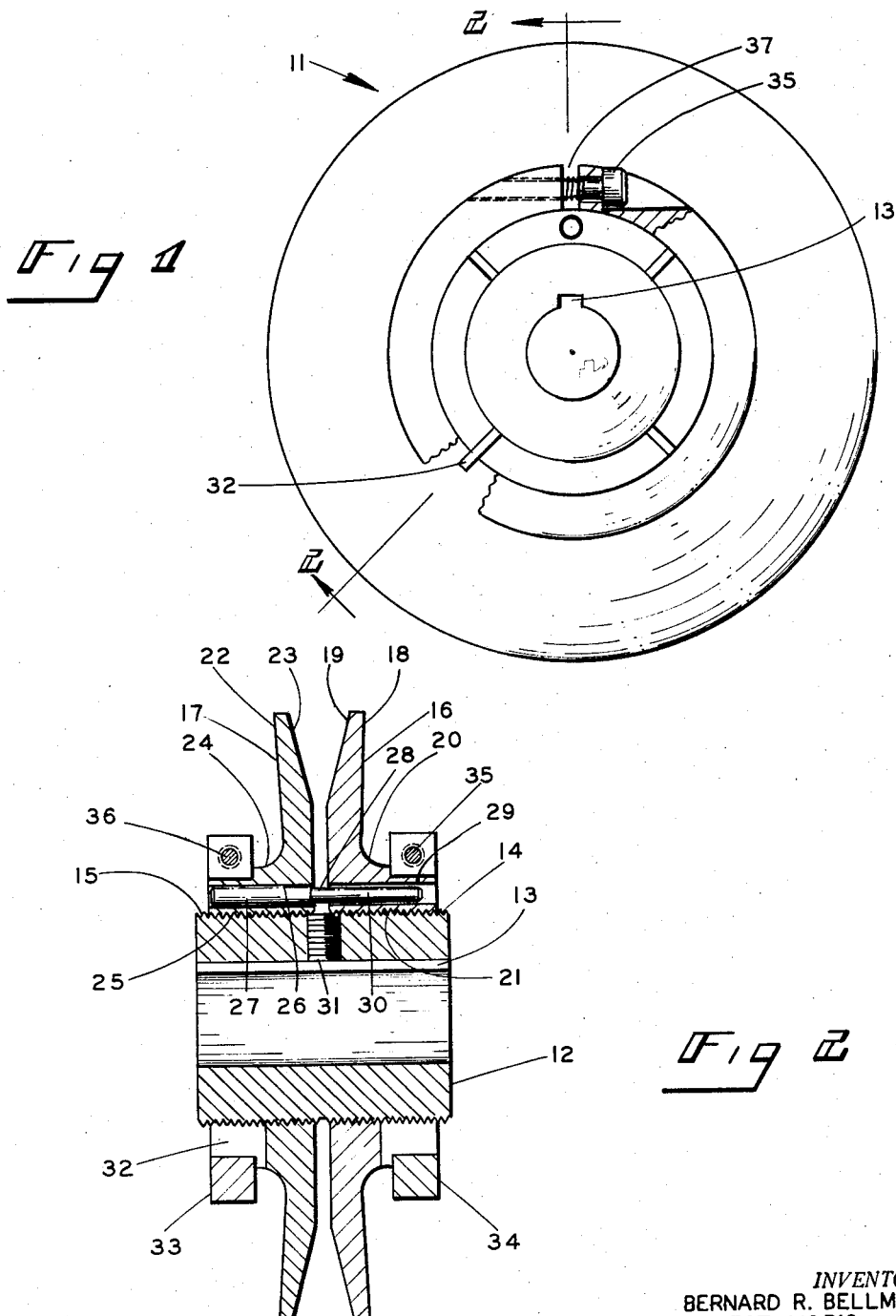
INVENTORS
BERNARD R. BELLMANN
ERNEST VORIS
BY
Reuben Wolk
ATTORNEY

United States Patent Office 2,870,641
Patented Jan. 27, 1959

2,870,641

ADJUSTABLE PULLEYS

Bernard R. Bellmann and Ernest Voris, Dayton, Ohio, assignors to The Dayton Rubber Company, Dayton, Ohio, a corporation of Ohio Application September 11, 1956, Serial No. 609,239

3 Claims. (Cl. 74—230.17)

This invention relates to adjustable pulleys of the type having sheaves for use with V-belts. More specifically, this invention relates to the construction of such pulleys in which the sheaves may be varied with relation to each other.

Pulleys of the type described are used in connection with power drives in which a V-belt is used for transmitting power from a motor to a remotely located device. It is frequently desired to vary the effective diameter of such pulleys in order to eliminate the need for changing the complete pulley assembly when it is necessary to vary the relative speed of the motor and the device. One simple way of accomplishing this purpose is merely to move the sheaves of the pulley toward or away from each other which permits the V-belt to ride higher or lower along the angled flanges of the sheaves. By means of this invention such a result is accomplished very simply and with a minimum of effort.

It is a primary object of this invention, therefore, to provide a pulley with variable sheaves.

A further object of the invention is to provide a novel method of moving said sheaves in an axial direction on the hub.

A further object of the invention is to provide a simple locking means in conjunction with the variable features of the pulley.

These and other objects are carried out by providing a central externally threaded hub for the pulley, each half of the threaded portion having opposite hand threads. The pulley sheaves are mounted on the hub, each sheave being internally threaded and matching one-half of the threaded portion of the hub. By means of a pin the center sheaves are interconnected such that rotation of either sheave upon the hub will drive the other sheave in an opposite axial direction.

One embodiment of the invention is illustrated in the following drawings in which:

Figure 1 is an end view of the pulley illustrating this invention.

Figure 2 is a sectional view of this pulley taken along lines 2—2 of Figure 1.

Referring now to the drawings, the pulley assembly 11 consists of a central hollow hub 12 in which is located a keyway 13 at its internal surface. The hub is threaded on its external surface; one-half of the length of this threaded portion 14 having a left-hand thread, while the other half 15 has a thread of the opposite hand. A pair of sheaves 16 and 17 are mounted on the hub. Sheave 16 includes an upstanding flange 18 with an inwardly beveled face 19, while the sheave 17 includes flange 22 and beveled face 23. The sheave 16 is threaded internally at 21 to mate with the threaded portion 14 of the hub; while the sheave 17 is internally threaded at 25 which mates with the threaded portion 15 of the hub. The inner portion of the sheaves 16 and 17 also include collars 20 and 24, respectively. The collar 24 has an aperture 26 passing therethrough in an axial direction in which is fastened a pin 27. This pin has a large diameter portion 28 and a smaller diameter portion 30 and is fastened in the aperture 26 by means of a press or drive fit between the large portion and the aperture. The small portion 30 fits loosely within the aperture 29 in the collar 20 of the sheave 16 for reasons to be presently described.

Mounted in the approximate center of the hub 12 and extending in a radial direction is a set screw 31 which is used for the purpose of fastening the pulley to a desired shaft. The sheaves 16 and 17 are locked on the hub by means of a pair of split ring locking members 33 and 34, one of which encircles each of the sheave collars. Each member 33 and 34 is comprised of a discontinuous flexible metal ring separated only by an open portion 37. Bolts 35 and 36 are passed through the rings in an axial direction as shown in the drawings, and adapted to engage with threaded portions of the ring on the opposite side. Each pulley sheave has a plurality of radial slots 32 extending partially through the collar portions thereof.

When it is desired to change the effective diameter of the pulley, the procedure is as follows:

The bolts 35 and 36 are loosened, thereby releasing the grip of the locking members 33 and 34 and permitting the sheaves 16 and 17 to rotate freely upon the hub. Either sheave is then manually rotated in the desired direction. If, for example, the sheave 17 is rotated, it will cause a similar rotary motion of the pin 27 by virtue of the close contact of the portion 28 of the pin within the aperture 26. This in turn causes a similar rotary motion of the portion 30 of the pin within the aperture 29 of the sheave 16, causing a similar rotary movement of this latter sheave. However, the fact that each half of the hub is oppositely threaded will cause the sheave 16 to move in an axial direction which is opposite to the axial direction of the movement of the sheave 17, thus causing the sheaves to move toward or away from each other as desired. When the sheaves have reached the desired relation to each other, the bolts 35 and 36 are again tightened, thus pulling the ends of the locking members 33 and 34 together and tightening the sheaves. This tightening is accomplished by squeezing together the slots 32 and causing the collars to grip the hub more tightly.

Thus, it can be seen by means of this invention, an extremely simple manipulation may be used to vary the effective diameter of this novel pulley. We do not intend to be limited by the specific modification shown herein, but variations within the spirit of the invention may be anticipated.

We claim:

1. An adjustable pulley for use with V-belts comprising a central hub having opposite hand threads on each half of its external surface and a keyway in its inner surface; a pair of sheaves including belt-engaging flanges and internally threaded inner collars, one of said collars mating with and mounted upon one-half of said hub, the other of said collars having an opposite hand thread to said one collar and mating with and mounted upon the other half of said hub; an aperture extending axially within one of said collars, a pin fixed to the other of said collars extending axially into said aperture, the portion of said pin extending into said aperture having a diameter less than said aperture diameter to permit free movement of said aperture-bearing collar in an axial direction.

2. The pulley of claim 1 including a locking means concentric with and encircling each of said collars, said locking means consisting of a discontinuous ring and a threaded member joining the ends of said ring.

3. The pulley of claim 1 in which each of said collars includes a plurality of radial slots.

References Cited in the file of this patent

UNITED STATES PATENTS

| | | |
|---|---|---|
| 1,116,845 | Rogers | Nov. 10, 1914 |
| 2,054,564 | Quiroz | Sept. 15, 1936 |
| 2,555,189 | Fuchslocher | May 29, 1951 |
| 2,618,162 | Dickerson | Nov. 18, 1952 |
| 2,639,621 | Harris | May 26, 1953 |

FOREIGN PATENTS

| | | |
|---|---|---|
| 237,353 | Great Britain | July 27, 1925 |